United States Patent

[11] 3,584,517

| [72] | Inventor | John L. Tomlinson |
| | | Oak Creek, Wis. |
| [21] | Appl. No. | 828,840 |
| [22] | Filed | May 29, 1969 |
| [45] | Patented | June 15, 1971 |
| [73] | Assignee | J.I. Case Company |

[54] MECHANISM FOR INTERCONNECTING PARTS
3 Claims, 3 Drawing Figs.

[52] U.S. Cl. .................................................. 74/473,
287/52.02
[51] Int. Cl. .................................................. G05g 9/00
[50] Field of Search .................................................. 85/5 B;
287/52.02, 53 TK, 52.05, 103 A, DIG.5; 279/30,
22, 75; 81/177.6, 121-1; 74/473

[56] References Cited

UNITED STATES PATENTS

| 1,298,196 | 3/1919 | Gairing ........................ | 279/22 UX |
| 1,526,565 | 2/1925 | Redmond ...................... | 279/22 |
| 1,613,976 | 1/1927 | Bellows ........................ | 81/177.6 UX |
| 1,613,981 | 1/1927 | Carlberg ....................... | 81/121-1 |
| 1,706,847 | 3/1929 | Fisher .......................... | 287/BallUX |
| 2,539,821 | 1/1951 | Eames .......................... | 287/52.05 |

FOREIGN PATENTS

| 338,856 | 11/1930 | Great Britain ............... | 287/103A |
| 668,864 | 3/1952 | Great Britain ............... | 287/52.05 |

*Primary Examiner*—David J. Williamowsky
*Assistant Examiner*—Andrew V. Kundrat
*Attorney*—Dressler, Goldsmith, Clement & Gordon

ABSTRACT: Interlock mechanism for securing a shaft in an opening. An axial recess extends from one end of the shaft and is intersected by a circumferential recess spaced from the end of the shaft. A ball is forced into a counterbore extending transversely of the opening with a portion of the ball located in the opening. The axial recess is aligned with the ball and the shaft is shifted along the opening until the ball is disposed in the circumferential recess whereupon rotation of the shaft will move the ball out of the axial recess and along the circumferential recess. The shaft is then maintained in the rotated position to secure the shaft in the opening.

PATENTED JUN 15 1971

3,584,517

INVENTOR
John L. Tomlinson
BY Dressler, Goldsmith, Clement & Gordon
ATTORNEYS

MECHANISM FOR INTERCONNECTING PARTS

BACKGROUND OF THE INVENTION

The present invention relates to mechanism for interlocking two parts.

As a way of background for the present invention, in many areas it is necessary to interconnect two parts which subsequently must be moved as a unit and in which the interconnecting mechanism must be capable of absorbing large forces during operation of the unit. By way of example, one such environment is the interconnection of a shifting fork and a shifting shaft which are utilized for engagement and disengagement of clusters of gears forming part of a transmission unit.

While many alternatives have been proposed, the most common type of interconnection between a shifting fork and a shifting shaft still remains the transversely extending pin which extends through an opening in both of the elements. However, many times the pin shears because of the extreme forces encountered. While the cost of the replacement item is rather nominal, the amount of time involved for replacing a very inexpensive pin results in considerable down time of an entire vehicle.

SUMMARY OF THE INVENTION

The present invention contemplates interconnecting two elements, particularly a shifter fork to a shaft, by locating a spherical member in a counterbore extending transversely of the opening in the shifter fork and having a depth substantially equal to the radius of the spherical member. The shaft is provided with an axially extending groove or recess extending from one end of the shaft and terminating intermediate the ends thereof while communicating with a transversely extending or circumferential recess defined on the inner end of the axial recess. The recesses have a cross-sectional configuration substantially identical to that of the spherical member.

The method of interconnecting the parts or elements includes the steps of aligning the spherical member with the axially extending recess, axially shifting the shaft to located the spherical member in the transversely extending recess and thereafter rotating the shaft within the opening to move the spherical member out of the axial recess.

Thus, the primary object of the present invention is to provide improved mechanism for interconnecting two elements which merely requires relative movement between the elements for providing such interlock.

Another object is to provide an improved method of assembling and securing a shaft within an opening.

Other objects of the invention will become apparent from the following detailed description when taken in conjunction with the accompanying drawings.

DETAILED DESCRIPTION

Figure 1:
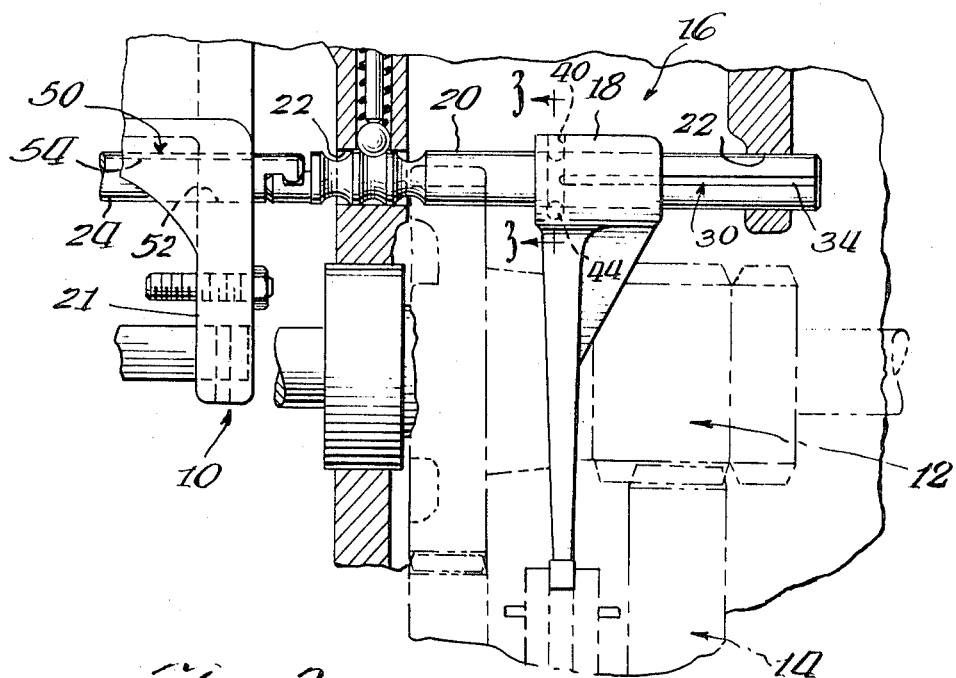
FIG. 1 is a side elevational view partially in section showing an illustrative environment for the present invention.
Figure 3:
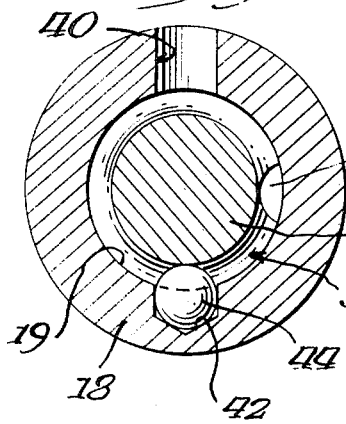
FIG. 3 is an enlarged sectional view taken generally along lines 3–3 of FIG. 1.
Figure 2:
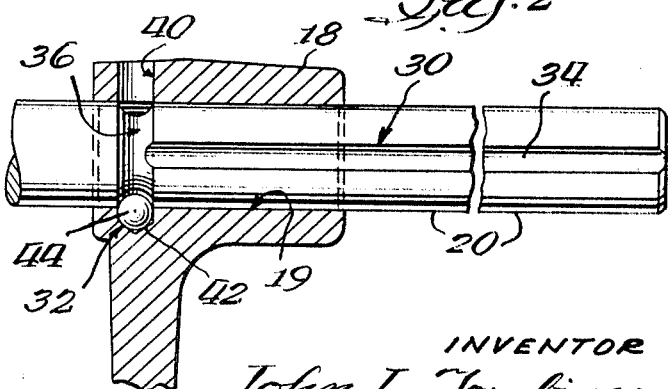
FIG. 2 is a vertical sectional view of two elements incorporating the present invention.

By way of environment for the present invention, FIG. 1 shows a fragmentary portion of a transmission unit 10 having gear clusters 12 and 14 adapted to be moved between engaged and disengaged positions by a shifting mechanism 16. The shifting mechanism 16 includes a shifter fork 18 having an opening 19 receiving a shaft 20 which is slidably disposed in spaced openings 22 and is axially shiftable by a further shaft 24 connected to suitable actuating mechanism, such as a manual control lever (not shown).

Since the shifting fork 18 and the shaft 20, in the illustrated environment, must be moved as a unit in order to move gear cluster 14, it is necessary to interconnect the two elements to insure that they will remain interconnected throughout the entire life of the transmission unit. As was indicated hereinabove, it has been customary to interconnect these two elements by merely providing a transversely extending opening through the shifter fork 18 and the shaft 20 and locating a pin in the opening to provide such interlock. However, such an arrangement has proved far from satisfactory in actual use of the mechanism described.

According to the present invention, means are provided for interlocking the two elements in a simple and effective manner and which is accomplished by mere relative movement of the two elements. The interlock mechanism of the present invention comprises first means defining longitudinal and transverse passage means 30 on the peripheral surface of the shaft 20 and connecting means 32 on the shifter fork 18. The longitudinal and transverse passage means 30 includes a first axially extending recess 34 extending from one end of the shaft 20 and terminating at its opposite end intermediate the ends of the shaft. The axially extending recess or groove 34 communicates at its inner end with a transversely or angularly related second recess or groove 36. In the illustrated embodiment, the transverse recess 36 on the peripheral surface of shaft 20 extends completely around the circumference of the shaft, but for purposes of the present invention, the circumferential length of the transverse or angularly related recess 36 need only extend a portion of the circumference, say for example 90°.

The connecting means or fixed abutment 32 defined in the opening 19 of fork 18 is provided in a simple and effective manner by a transversely extending opening 40 which intersects the opening 19 and terminates just beyond the surface of opening 19 to define a counterbore 42 extending transversely of the opening 19. The counterbore 42 has a spherical member or ball 44 received therein and positioned so as to have at least a portion thereof extending into the opening 19. One manner of insuring that the proper relationship between the ball 44 and the opening 19 exists is to have counterbore 42 extend to a depth substantially equal to the radius of the ball 44. Thus, the ball 44 can be forced into the counterbore or opening 42 and will insure that approximately one-half or a hemispherical portion will extend into the opening 19.

For purposes of terminology, the surface defined by opening 19 and the surface defined by shaft 20 may be considered mating surfaces with the opening surface 19 being an internal surface and the peripheral surface of shaft 20 being an external surface defined on the respective elements or members comprising shifter fork 18 and shaft 20.

The method of interconnecting the two parts or elements comprises the steps of axially aligning the ball which may be termed to define a protuberance extending from the internal surface 19 with the elongated or axially extending recess 34, producing relative movement of the shaft axially along the opening 19 so as to slide the protuberance or ball along the longitudinal recess 34 until the ball is located in the transversely or angularly related recess 36. Subsequently, the shaft is moved in a second direction or rotated within the opening 19 so as to move the ball or protuberance along the transverse recess and out of the longitudinal recess. In the final assembled position, the recesses and the protuberance or projection 44 will assume the position shown in the drawings and, by maintaining an oriented relationship between the two elements, the elements are securely interlocked and will move as a unit.

By way of illustration, and not of limitation, the illustrated means for maintaining the two elements or the shifter fork 18 and shaft 20 in oriented relationship is automatically accomplished by having the shifter fork 18 connected to the gear cluster 14 in a manner so as to prevent rotational movement of the shifter fork about the axis defined by the shaft 20. The shaft 20 is maintained in a nonrotating position by a projection or key 50 defined in opening 52 on the support member 21 with an axially extending groove 54 provided on the shaft 24 and receiving the key 50. Thus, the interconnection between the two shafts 20 and 22 as well as the key and slot arrangement between shaft 24 and the support 21, will maintain the shaft 20 in the oriented position shown in the drawings. Of course, many other means may be provided for maintaining the shaft 20 in an oriented position. For example, the shaft 24 is normally connected to a control lever in a manner such that rotation of shaft 24 as well as the shaft 20 is prevented and the lever may then be relied upon as maintaining the shafts 20 and 24 in the oriented position.

As can be appreciated from the above description, the present invention provides a simple and effective manner of securely interlocking the shaft 20 within the opening 19 defined in the shifter fork 18. If the ball 44 has a hardness greater than the hardness of the materials for the shaft 20 and/or the shifter fork 18, the only way the shaft could be axially shifted in opening 19, once in the assembled condition shown in the drawings, is for a complete destruction of one of the two elements. The improved interlock mechanism as well as the method for assembling the two parts, can readily be incorporated into any environment wherein two parts having mating surfaces which can be moved relative to each other during assembly of the two parts.

What I claim is:

1. A shifting mechanism for a multispeed transmission and including a support, a shifter fork having an opening defining an internal surface and a shifter shaft received in said opening and having an external surface, said shifter shaft being slidably supported by said support, means for securing said shaft to said fork comprising first means defining a fixed abutment on one of said surfaces and extending towards another of said surfaces, and second means defining an elongated first recess on the other of said surfaces and a second recess angularly related to and intersecting said first recess whereby interconnection of said shaft and fork is accomplished by axial alignment of said abutment with said first recess, axial movement of said shaft in said opening to locate said abutment in alignment with said second recess and rotation of said shaft in said opening to dispose said abutment in said second recess, and interengaging means between said shaft and support to prevent relative rotation of said shaft, said fork cooperating with a transmission element to prevent rotation of said fork on said shaft and maintain said abutment in said second recess.

2. The combination as defined in claim 1, in which said abutment comprises a ball received in a counterbore defined in said one of said surfaces, said counterbore having a depth substantially equal to the radius of said ball whereby approximately one-half of said ball extends beyond said one of said surfaces.

3. The combination as defined in claim 1, in which said second means is defined on said external surface with said first recess extending axially from one end of said shaft and said second recess extending circumferentially of said shaft at the opposite end of said first recess.